US007808233B2

(12) United States Patent
Jensen

(10) Patent No.: US 7,808,233 B2
(45) Date of Patent: Oct. 5, 2010

(54) METHODS AND APPARATUS FOR MONITORING ROTARY MACHINES

(75) Inventor: Raymond V. Jensen, Gardnerville, NV (US)

(73) Assignee: General Electric Company, Schenectady, NY (US)

(*) Notice: Subject to any disclaimer, the term of this patent is extended or adjusted under 35 U.S.C. 154(b) by 677 days.

(21) Appl. No.: 11/424,933

(22) Filed: Jun. 19, 2006

(65) Prior Publication Data

US 2007/0290873 A1 Dec. 20, 2007

(51) Int. Cl.
*G01B 7/30* (2006.01)
(52) U.S. Cl. .................. 324/207.25; 324/174
(58) Field of Classification Search ............ 324/207.25, 324/207.26, 207.15, 226, 207.17, 174
See application file for complete search history.

(56) References Cited

U.S. PATENT DOCUMENTS

| 4,675,670 A |   | 6/1987 | Lalonde et al. |
|---|---|---|---|
| 4,804,905 A | * | 2/1989 | Ding et al. .................. 324/662 |
| 4,950,986 A |   | 8/1990 | Guerrero |
| 5,513,539 A |   | 5/1996 | McLaughlin et al. |

FOREIGN PATENT DOCUMENTS

| DE | 4142707 C1 | 1/1993 |
|---|---|---|
| DE | 19643538 A1 | 4/1998 |
| DE | 10136482 A1 | 2/2003 |
| DE | 10336528 A1 | 3/2005 |
| GB | 1598205 | 9/1981 |
| JP | 57 148557 A | 9/1982 |
| JP | 57148557 A | 9/1982 |

OTHER PUBLICATIONS

EP Search Report, App. No. EP 07 11 0410 (Oct. 26, 2007).
European Search Report and Opinion, European Patent Office, Application No. 07110410.3-2207, Date of Completion of Search Oct. 26, 2007, 7 pages.

\* cited by examiner

*Primary Examiner*—Reena Aurora
(74) *Attorney, Agent, or Firm*—Armstrong Teasdale LLP

(57) ABSTRACT

A rotary machine includes at least one rotating member and at least one stationary member positioned such that a clearance gap is defined between a portion of the at least one rotating member and a portion of the at least one stationary member. The clearance gap has a measurable radial dimension and a measurable magnetic flux is generated in the clearance gap at least partially by relative movement between the stationary member and the rotating member. A method of monitoring a clearance gap measurement system for the rotary machine includes providing at least one clearance gap measurement assembly. The measurement assembly has at least one dimension measurement apparatus and at least one magnetic flux measurement apparatus. The method also includes positioning the at least one measurement assembly on the stationary member to facilitate measurements of the clearance gap during operation of the rotary machine.

20 Claims, 4 Drawing Sheets

METHODS AND APPARATUS FOR MONITORING ROTARY MACHINES

BACKGROUND OF THE INVENTION

This invention relates generally to rotary machines and more particularly, to methods and apparatus for monitoring turbine generators.

Many known hydroelectric turbines include a multiple-bladed rotor mounted within a housing coupled in flow communication with an elevated fluid source, such as a reservoir. Water from the source enters a pipe and travels downhill to the hydroelectric turbine. As the water descends, gravitational potential energy is transformed into kinetic energy in the form of mechanical hydraulic energy. The water is then channeled through the turbine wherein it imparts rotation within the turbine. At least one generator rotor is rotationally coupled to, and driven by the turbine rotor. Some known electric generators typically use a plurality of magnets coupled to a rotor and a plurality of stationary wire coils coupled to a stator to convert the turbine's rotational energy into electric energy.

In some known generators, rotor components and stator components are separated by an air gap that is typically measured in distance units. During operation, a magnetic field generated by the magnets mounted to the rotor passes through a portion of the air gap defined between at least a portion of a surface of the rotor and at least a portion of a surface of the stator. The effectiveness of the transmission of the magnetic field through the air gap is at least partly dependent on maintaining the dimensions of the air gap, i.e., the radial distance between the rotor surface and the stator surface. However, asymmetric and/or transient loads induced to the rotor may cause the rotor to deflect such that the air gap dimension is reduced and/or altered to be non-uniform. The changes to the dimensions of the air gap may adversely affect the magnetic field. Moreover, in the event of a generator malfunction, for example, short circuited windings, the effect on the magnetic field may also be adverse.

BRIEF DESCRIPTION OF THE INVENTION

In one aspect, a method of monitoring a rotary machine is provided. The rotary machine includes at least one rotating member and at least one stationary member positioned such that a clearance gap is defined between a portion of the at least one rotating member and a portion of the at least one stationary member. The method includes providing at least one measurement assembly to determine a width of the clearance gap. The at least one measurement assembly includes at least one measurement apparatus and at least one magnetic flux measurement apparatus. The method also includes positioning the at least one clearance gap measurement assembly on the stationary member to facilitate measurements of the clearance gap during operation of the rotary machine.

In another aspect, a clearance gap measurement assembly is provided. The assembly includes at least one clearance gap radial dimension measurement apparatus and at least one clearance gap magnetic flux measurement apparatus.

In a further aspect, a rotary machine is provided. The machine includes at least one rotating member and at least one stationary member positioned such that a clearance gap is defined between a portion of the rotating member and a portion of the stationary member. The machine also includes a clearance gap measurement system. The system includes a clearance gap measurement assembly that includes at least one clearance gap radial dimension measurement apparatus and at least one clearance gap magnetic flux measurement apparatus.

DETAILED DESCRIPTION OF THE INVENTION

Figure 1:
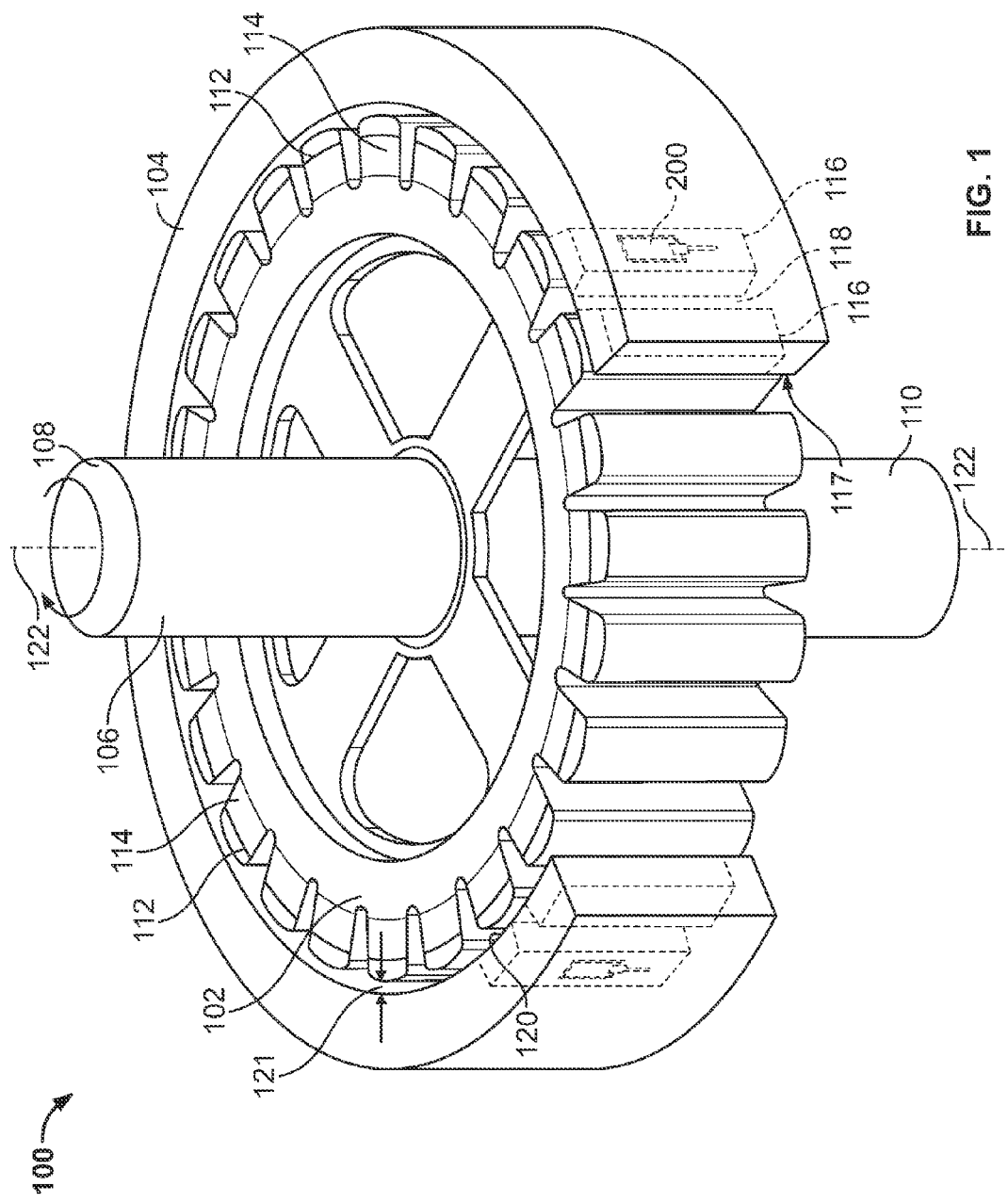
FIG. 1 is a perspective view of a portion of an exemplary generator that may be driven by a hydroelectric turbine.

FIG. 1 is a cross-sectional schematic view of an exemplary rotary machine 100 that may be driven by a hydroelectric turbine (not shown in FIG. 1). In the exemplary embodiment, rotary machine 100 is a synchronous, three-phase, 60 Hz, separately-excited generator 100 that includes a salient pole rotor 102 and a stator 104. Alternatively, generator 100 is any type of generator including, but not limited to, round rotor generators. Also, alternatively, rotary machine 100 may be an electric motor that includes, but is not limited to, salient pole motors. Rotor 102 includes a rotor shaft 106 that includes an exciter end 108 and a turbine end 110. Rotor shaft exciter end 108 is rotatingly coupled to an exciter (not shown in FIG. 1) and turbine end 110 is rotatingly coupled to the hydroelectric turbine. Alternatively, turbine end 110 is coupled to a drive such as, but not limited to, a gas, steam, and wind turbine (neither shown in FIG. 1). Rotor 102 also includes a plurality of salient poles 112, about which excitation windings 114 are wound with a plurality of turns on each pole 112.

Windings 114 are coupled in electrical communication with the exciter via slip rings (not shown in FIG. 1) through which excitation power is transmitted to generate a magnetic field (not shown in FIG. 1) that rotates with rotor 102. Alternatively, generator 100 is a permanent magnet generator such that rotor 102 includes enclosed permanent magnets (not shown in FIG. 1) that generate the magnetic field. Also, alternatively, windings 114 may be coupled in electrical communication with a direct current electrical power source such as, but not limited to, batteries and/or rectifiers.

In the exemplary embodiment, stator 104 includes a plurality of teeth 116 (only two illustrated in phantom in FIG. 1), that each have a radially inner periphery 117 that defines a plurality of slots 118 (only one illustrated in FIG. 1). Stator windings (not shown in FIG. 1) are positioned within slots 118. A clearance gap 120 is defined between a radially inner periphery of stator 104 and a radially outer periphery of rotor 102. Gap 120 facilitates magnetic coupling of rotor 102 and stator 104 to enable varying voltage and varying current to be generated within the windings of stator 102. A plurality of power supply cables (not illustrated in FIG. 1) electrically couple generator 100 to a power delivery system (not illustrated in FIG. 1). Rotor shaft 106 is rotatable about an axis of rotation 122 that may be at any orientation that facilitates attaining predetermined operational parameters of generator 100.

Generator 100 also includes a housing (not illustrated in FIG. 1) that facilitates isolating generator 100 from an external environment, and at least one clearance gap measurement assembly 200, described in more detail below. Assembly 200 is coupled to stator teeth inner periphery 117, is illustrated in phantom in FIG. 1, and measures a width 121 of clearance air gap 120 and magnetic field as discussed further below.

In operation, rotation of the turbine rotates rotor shaft 106 and subsequently rotates rotor poles 112 within stator 104. Rotor windings 114 generate a magnetic field that traverses clearance gap 120. Rotational movement of rotor 102 causes the magnetic field to interact with the stator windings to subsequently generate a voltage in the stator windings. Subsequently an electrical current is generated that is transmitted to the power delivery system. Uniformity of clearance gap 120 facilitates enhancing the generation of the magnetic field by rotor 102. However, mechanical loads and thermal stresses induced on rotor 102 may cause rotor 102 to shift such that clearance gap 120 is not uniform. A non-uniform clearance gap 120 may alter the shape and strength of the magnetic field between rotor 102 and stator 104. Moreover, formation of a short circuit condition associated with a plurality of windings 114 may also affect the strength of the magnetic field.

Figure 2:
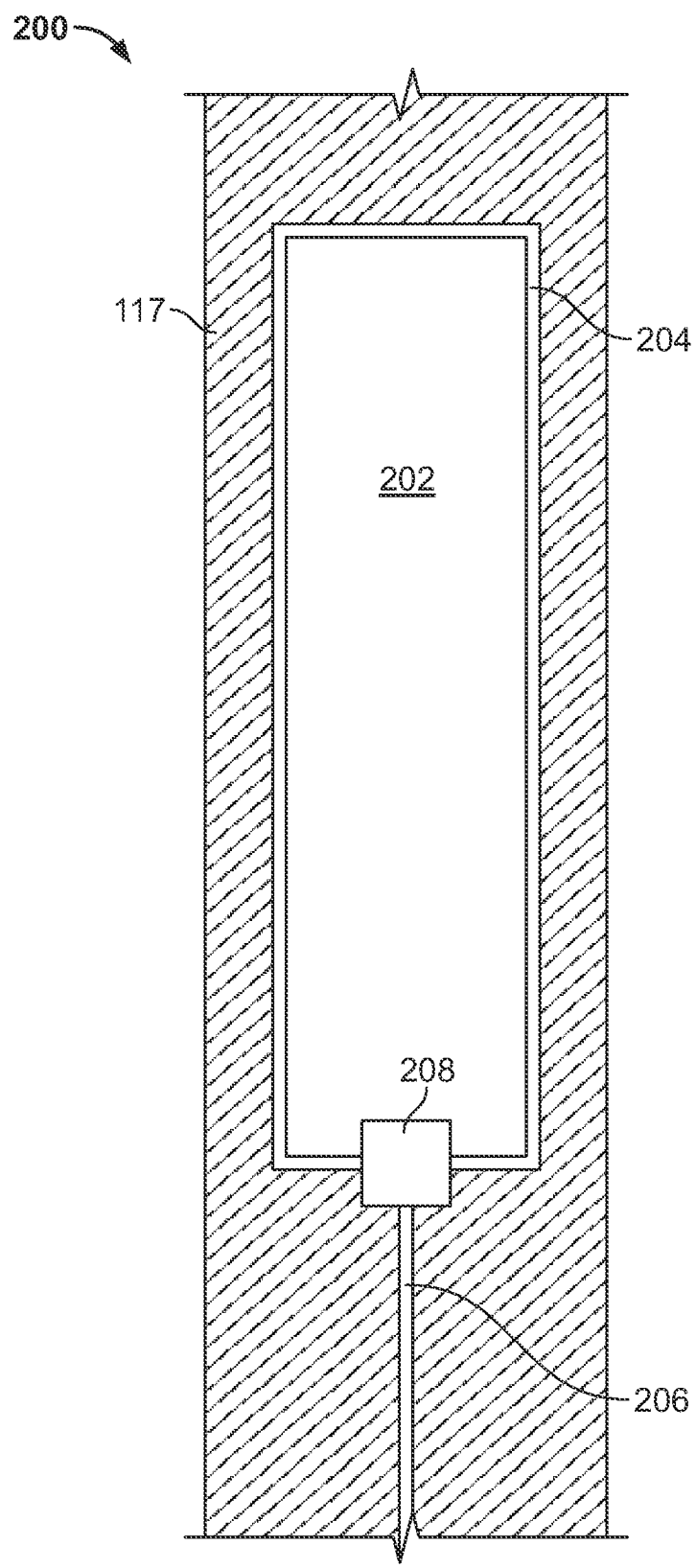
FIG. 2 is a schematic view of an exemplary clearance gap measurement assembly that may be used with the generator shown in FIG. 1.
Figure 3:
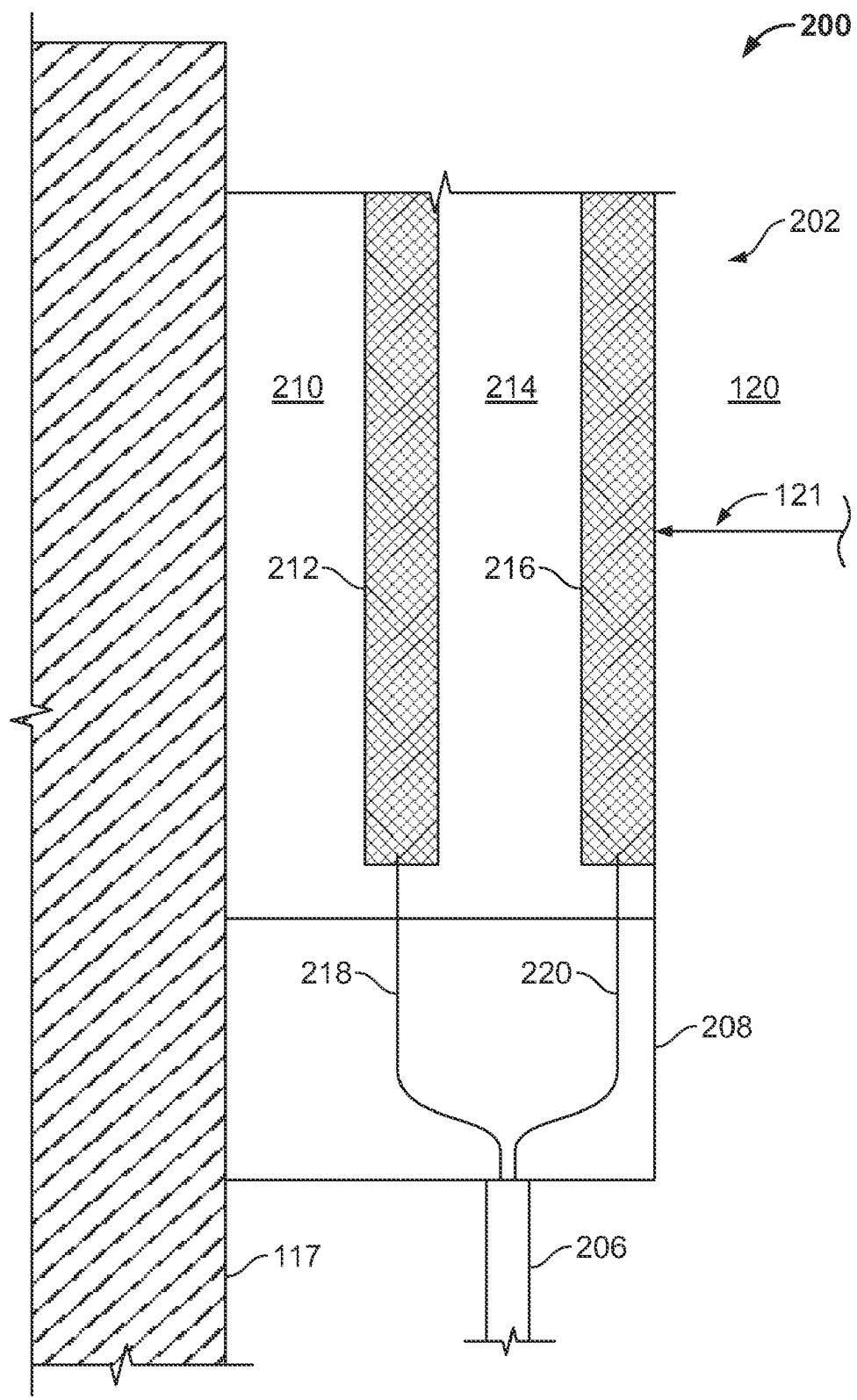
FIG. 3 is a cross-sectional view of a portion of the clearance gap measurement assembly shown in FIG. 2.

FIG. 2 is a schematic view of gap measurement assembly 200. FIG. 3 is a cross-sectional schematic view of a portion of assembly 200. In the exemplary embodiment, a plurality of clearance gap measurement assemblies 200 are positioned within generator 100 to facilitate measuring width 121 of gap 120. In general, assemblies 200 may be positioned anywhere within generator 100 that enable assemblies 200 to function as described herein. In the exemplary embodiment, assemblies 200 are fixedly secured to the inner periphery 117 of stator teeth 116 using methods that include, but are not limited to, adhesives, retention hardware and tack welding. Alternatively, a plurality of measurement assemblies 200 may be positioned within slots 118. In one embodiment, each assembly is substantially rectangular in shape. Alternatively, assemblies 200 may have any shape that enables assemblies 200 to function as described herein.

Measurement assembly 200 includes a width measurement apparatus 202 and a magnetic flux measurement apparatus 204. In the exemplary embodiment, apparatus 202 is a parallel plate, capacitive proximity probe 202 and apparatus 204 is an induction loop. Alternatively, apparatus 202 and 204 are any components that perform as described herein. Each assembly 200 includes at least one cable 206 that facilitates powering apparatus 202 and 204 and facilitates transmission of gap width 121 and magnetic flux signals. In the exemplary embodiment, each cable 206 is electrically coupled with apparatus 202 and 204 via a terminal connection enclosure 208. Moreover, each cable 206 is routed through a cable passage (not illustrated in FIGS. 2 and 3) formed within, or in the vicinity of, stator 104.

Apparatus 202 includes a first electrically insulating material layer 210 that electrically isolates an inner plate 212 from stator tooth periphery 117. Apparatus 202 also includes a second electrically insulating material layer 214 that electrically isolates inner plate 212 from an outer plate 216. Layers 210 and 214 extend between terminal connection enclosure 208 and plates 212 and 216 to facilitate insulating enclosure 208 from plates 212 and 216. A power supply wire 218 electrically coupled to an electrical power source (not shown in FIGS. 2 and 3) supplies power to inner plate 212 and facilitates generating an electrostatic field (not illustrated in FIGS. 2 and 3) between plates 212 and 216. In addition, apparatus 202 also includes a signal wire 220 that is electrically coupled to a remote monitoring system (not illustrated in FIGS. 2 and 3) to transmit signals indicative of a width 121 of gap 120.

In the exemplary embodiment, magnetic flux measurement apparatus 204 is a closed-loop, electrically-conducting material that includes, but is not limited to, a metal material and/or metal alloys. In the exemplary embodiment, apparatus 204 is a known guard element or a shield used with a known air gap sensor that has been modified. For example, in one embodiment, apparatus 204 is a modified 4000-series 50 mm air gap sensor commercially available from General Electric Bently Nev., Minden, Nev. The guard element is typically an electrically conductive band that includes a split defined within a portion of the guard, wherein the guard is generally perpendicular to the gap width being measured. The guard facilitates directing an electrostatic field generated by an air gap sensor that is similar to apparatus 202, such that the field is concentrated between the sensor and rotor 102. Typically, the guard is maintained at approximately the same voltage as the sensor. The split defined within the guard mitigates generation of electrical currents within the guard that subsequently facilitates mitigation of electrical interference within the air gap sensor. In the exemplary embodiment, apparatus 204 is substantially similar to the guard with the exception that the guard element split is sealed to form the closed loop. Moreover, apparatus 204 is configured to generate voltage when exposed to a magnetic field. As such, apparatus 204 is not externally powered.

In the exemplary embodiment, magnetic flux signals are transmitted to the monitoring system via at least one wire (not illustrated in FIGS. 2 and 3) used within cable 206. Alternatively, magnetic flux signals are transmitted to the monitoring system via a wire 220 used in conjunction with gap distance signals. In another alternative embodiment, apparatus 204 is not co-planar with plate 216, but rather may be adjacent to insulating layer 210 such that no electrical contact exists between apparatus 204 and periphery 117 and plate 212. In this alternative embodiment, the original guard associated with the known air gap sensor may be maintained with assembly 200. Also, in a further alternative embodiment, the guard (not illustrated in FIGS. 2 and 3) for assembly 200 is maintained with an associated split and apparatus 204 is positioned adjacent to, and either circumferentially internally, or circumferentially externally, to the guard. Moreover, in an alterative embodiment, apparatus 204 includes a plurality of conductive loops that are each positioned within an individual, parallel plane (or, layer) within apparatus 204.

In operation, as rotor poles 112 rotate past stator teeth outer periphery 117, clearance gap width 121 is measured by apparatus 202. When gap width 121 remains substantially constant and capacitance features of apparatus 202 are maintained substantially constant, apparatus 202 transmits a substantially constant gap width signal (not shown in FIGS. 2 and 3). If clearance gap width 121 changes, the capacitance of apparatus 202 changes and the gap width signal transmitted from apparatus 202 to the monitoring system via wire 220 is changed or varied.

Also, in operation, apparatus 204 is exposed to the varying magnetic field generated within gap 120 and a varying voltage that is proportional to the varying strength of the magnetic field, i.e., the magnetic flux density, is generated and transmitted to the monitoring system. Voltage generated in apparatus 204 is also proportional to the number of turns within apparatus 204 and the amount of surface area of apparatus 204 that is perpendicular to the magnetic field lines of flux. Rotor 102 and stator 104 are configured, and assembly 200 is positioned, to facilitate increasing the number of the magnetic lines of flux that are substantially perpendicular to apparatus 204.

Figure 4:
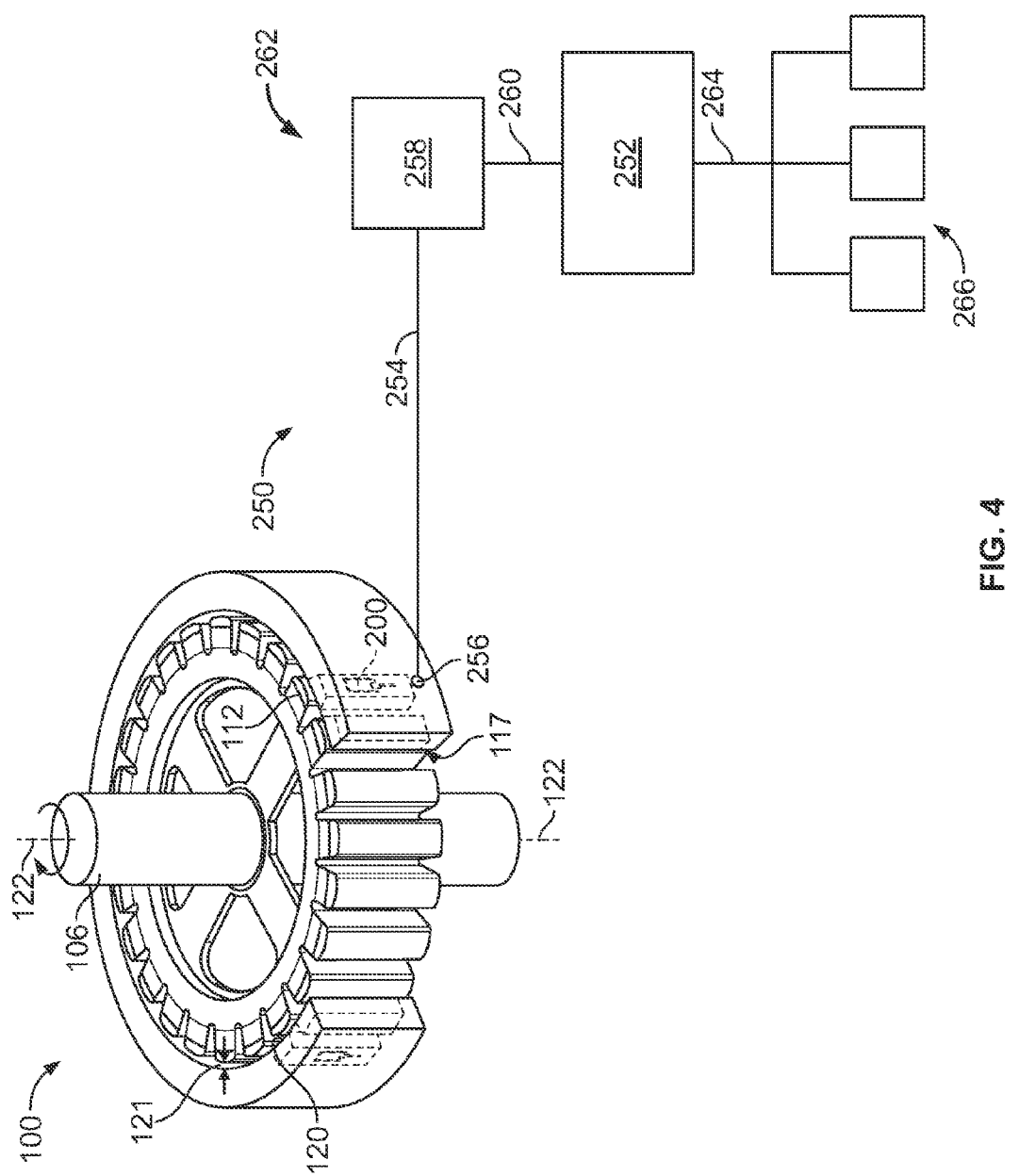
FIG. 4 is a block diagram of an exemplary air gap monitoring system that may be used with the generator shown in FIG. 1.

FIG. 4 is a block diagram of an exemplary clearance gap monitoring system 250 that may be used with generator 100. In the exemplary embodiment, system 250 includes at least one assembly 200 positioned on the radially inner periphery 117 of at least one stator tooth. Assembly 200 is configured to measure a radial distance dimension i.e., a width 121 and a magnetic flux of clearance gap 120 between periphery 117 and rotor pole 112. Moreover, assembly 200 is electrically coupled with at least one data processing assembly 252 via a sensor cable 254 routed through cable passage 256, an intermediate electrical junction box 258, and a data processing assembly input cable 260. Electronic signal devices that may include, but not be limited to, at least one of signal conditioning apparatus (not shown in FIG. 4) may be positioned within junction box 258 and/or elsewhere to facilitate electronic signal transmission as discussed herein. In the exemplary embodiment, sensor cable 254, junction box 258, and cable 260 cooperate to define a plurality of processor input channels 262, i.e., at least one gap dimension channel and at least one flux measurement channel (neither shown in FIG. 4). Alternatively, a network of transmitters and receivers operating in the radio frequency (RF) band may be used to define input channel 262. Junction box 258 is configured to receive a plurality of cables similar to sensor cable 254. Moreover, data processing assembly 252 is configured to receive a plurality of cables similar to cable 260. In the exemplary embodiment, cable 254 includes a power supply wire 218, a dedicated gap distance measurement wire 220 (both shown in FIG. 3) and a dedicated flux measurement wire (not shown in FIG. 4). Alternatively, gap distance and flux measurements are transmitted over a common wire 220.

Data processing assembly 252 includes at least one processor and a memory (neither shown in FIG. 3), at least one input channel 262, at least two output channel 264, and may include at least one computer (not shown in FIG. 4). In the exemplary embodiment, each output channel 264 includes a cable 264 that is electrically coupled to at least one output device 266, i.e., an operator interface terminal (OIT's) 266 and/or data processing assembly 252. Output channels 264 also include at least one gap width channel and at least one flux measurement channel (neither shown in FIG. 4). Alternatively, a network of transmitters and receivers operating in a predetermined portion of a radio frequency (RF) band may be used to define plurality of output channels 264.

As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (neither shown in FIG. 4), and these terms are used interchangeably herein. In the exemplary embodiment, memory may include, but is not limited to, a computer-readable medium, such as a random access memory (RAM) (neither shown in FIG. 4). Alternatively, a floppy disk, a compact disc—read only memory (CD-ROM), a magneto-optical disk (MOD), and/or a digital versatile disc (DVD) (neither shown in FIG. 4) may also be used. Also, in the exemplary embodiment, additional input channels (not shown in FIG. 4) may be, but not be limited to, computer peripherals associated with OIT's 266 such as a mouse and a keyboard (neither shown in FIG. 4). Alternatively, other computer peripherals may also be used that may include, for example, but not be limited to, a scanner (not shown in FIG. 4). Furthermore, in the exemplary embodiment, additional output channels may include, but not be limited to, additional data displays and operational control mechanisms (neither shown in FIG. 4).

Processors for assembly 252 process information, including clearance gap position signals and magnetic flux signals from assemblies 200. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and comparator algorithms. The execution of sequences of instructions is not limited to any specific combination of hardware circuitry and software instructions.

In operation, when rotor shaft 106 is deflected away from nominal axis of rotation 122, width 121 of gap 120 around the circumference of generator 100 may become non-uniform. Assemblies 200 monitor the dimensions and magnetic fluxes of gap 120 and transmit the associated clearance gap width 121 and magnetic flux measurement signals, or gap width 121 and flux signals, (neither shown in FIG. 4) to assembly 252. The gap width and flux measurement signals are typically voltages or electrical current signals converted to separate dimension and flux measurements by at least one resident conversion algorithm for each of the width and flux measurements within the processors of assembly 252 (not shown in FIG. 4). Examples of conversion algorithms may include, but are not limited to, integration algorithms to convert the varying flux voltage signals that are proportional to the rate of change of magnetic flux within gap 120 to magnetic flux values that may be interpreted by an operator. In an alternative embodiment, distance and flux values are transmitted on a single channel, and a discrimination algorithm is used to discriminate between the distance and flux signals and to route each for separate transmission to separate portions of assembly 252 for further processing. The processed gap dimension and flux signals are subsequently transmitted by output channels 264 to OIT's 266. Evaluation of the gap dimension and flux signals by an operator is facilitated by both of the signals originating from a substantially common point within generator 100 and both signals being generated and obtained at a substantially common time.

The methods and apparatus for a generator clearance gap measurement system described herein facilitate operation of a hydroelectric turbine generator. Specifically, the generator clearance gap measurement assembly as described above facilitates an efficient and effective clearance gap radial distance and magnetic flux measurement scheme. More specifically, such measurement assemblies facilitate a smaller instrumentation footprint within such generators since only one assembly need be positioned within the generator rather than two independent sensors. Moreover, such assemblies also facilitate time and location synchronization of distance and flux measurements. Such measurement assemblies facilitate reduced capital and installation costs, generator reliability, and reduced maintenance costs and generator outages.

Exemplary embodiments of generator measurement systems as associated with hydroelectric turbine generators are described above in detail. The methods, apparatus and systems are not limited to the specific embodiments described herein nor to the specific illustrated hydroelectric turbine generators.

While the invention has been described in terms of various specific embodiments, those skilled in the art will recognize that the invention can be practiced with modification within the spirit and scope of the claims.

What is claimed is:

1. A method of monitoring a rotary machine, the rotary machine having at least one rotating member and at least one stationary member positioned such that a clearance gap is defined between a portion of the at least one rotating member and a portion of the at least one stationary member, said method comprising:

providing at least one clearance gap measurement assembly to determine a width of the clearance gap, wherein the at least one clearance gap measurement assembly includes at least one clearance gap dimension measurement apparatus and at least one clearance gap magnetic flux measurement apparatus;

positioning the at least one clearance gap measurement assembly on the at least one stationary member;

determining a change of capacitance within the at least one clearance gap measurement assembly;

generating a measurement of the clearance gap during operation of the rotary machine based on the change of capacitance; and synchronizing the at least one clearance gap dimension measurement apparatus and the at least one clearance gap magnetic flux measurement apparatus to evaluate a clearance gap dimension input signal and a clearance gap magnetic flux input signal to be acquired substantially simultaneously.

2. A method in accordance with claim 1 wherein said positioning at least one clearance gap measurement assembly further comprises coupling the at least one clearance gap measurement assembly at a predetermined radial and circumferential position relative to the stationary member to measure the width of the clearance gap and a magnetic flux within the clearance gap.

3. A method in accordance with claim 1 wherein said coupling the at least one clearance gap measurement assembly comprises using an adhesive to couple the at least one clearance gap measurement assembly at the predetermined position.

4. A method in accordance with claim 1 wherein said coupling the at least one clearance gap measurement assembly comprises using a mechanical fastener to securely couple the at least one clearance gap measurement assembly at the predetermined position.

5. A method in accordance with claim 1 further comprising:

generating a rotating magnetic field about at least a portion of the at least one rotating member; and forming a measurable magnetic flux within the clearance gap.

6. A method in accordance with claim 1 further comprising coupling the at least one clearance gap measurement assembly to at least one output apparatus, said coupling comprising synchronizing at least one clearance gap dimension input channel and at least one clearance gap magnetic flux input channel such that the clearance gap dimension input signal and the clearance gap magnetic flux input signal are acquired substantially simultaneously.

7. A clearance gap measurement assembly comprising:

at least one clearance gap dimension measurement apparatus configured to determine a change of capacitance using a proximity probe; and at least one clearance gap magnetic flux measurement apparatus configured to determine a change in voltage by measuring magnetic flux, wherein said at least one clearance gap dimension measurement apparatus and said at least one clearance gap magnetic flux measurement apparatus are synchronized such that a clearance gap dimension input signal and a clearance gap magnetic flux input signal are acquired substantially simultaneously.

8. A clearance gap measurement assembly in accordance with claim 7 wherein said at least one clearance gap dimension measurement apparatus comprises a capacitive proximity probe for use in monitoring the width of a clearance gap.

9. A clearance gap measurement assembly in accordance with claim 7 wherein said at least one magnetic flux measurement apparatus determines the change in voltage by measuring magnetic flux within a clearance gap, and comprises an electrically conductive material formed into at least one loop, the orientation of the at least one loop being selected from the group consisting of:

a loop extending circumferentially around at least a portion of a periphery of said at least one clearance gap dimension measurement apparatus;

a loop extending within a plane substantially co-planar with said at least one clearance gap dimension measurement apparatus; and a loop extending within a plane substantially parallel to a plane of said at least one clearance gap dimension measurement apparatus.

10. A clearance gap measurement assembly in accordance with claim 7 wherein said at least one clearance gap dimension measurement apparatus and said at least one clearance gap magnetic flux measurement apparatus are substantially time and position synchronized such that the clearance gap dimension input signal and the clearance gap magnetic flux input signal are acquired substantially simultaneously from substantially similar locations.

11. A rotary machine comprising:

at least one rotating member;

at least one stationary member positioned such that a clearance gap is defined between a portion of said at least one rotating member and a portion of said stationary member; and a clearance gap measurement system coupled to said at least one stationary member, said at least one clearance gap measurement system comprising at least one clearance gap measurement assembly, said at least one clearance gap measurement assembly comprising at least one clearance gap dimension measurement apparatus and at least one clearance gap magnetic flux measurement apparatus, wherein said at least one clearance gap dimension measurement apparatus is configured to determine a change of capacitance, said at least one clearance gap magnetic flux measurement apparatus is configured to determine a change in voltage, wherein said at least one magnetic flux measurement apparatus comprises an electrically conductive material formed into one of:

a closed loop extending circumferentially around at least a portion of said at least one clearance gap dimension measurement apparatus;

a closed loop extending within a plane substantially co-planar with said at least one clearance gap dimension measurement apparatus; and a closed loop extending within a plane substantially parallel to a plane of said at least one clearance gap dimension measurement apparatus.

12. A rotary machine in accordance with claim 11 wherein said at least one clearance gap dimension measurement apparatus comprises a capacitive proximity probe.

13. A rotary machine in accordance with claim 11 wherein said closed loop extending circumferentially around at least a portion of said at least one clearance gap dimension measurement apparatus comprises said closed loop extending circumferentially around at least a portion of a periphery of said at least one clearance gap dimension measurement apparatus.

14. A rotary machine in accordance with claim 11 wherein said at least one stationary member comprises at least one tooth defined therein, said at least one clearance gap measurement assembly is fixedly coupled within said at least one tooth of said at least one stationary member.

15. A rotary machine in accordance with claim 14 wherein said at least one clearance gap measurement assembly is positioned on a radially inner surface of said at least one stationary member, the radially inner surface defining the at least one tooth.

16. A rotary machine in accordance with claim 11 further comprising:
- at least one processor input channel coupled in electronic data communication with said at least one clearance gap measurement apparatus, said at least one processor input channel facilitates transmission of a clearance gap dimension input signal and a clearance gap magnetic flux input signal from said at least one clearance gap measurement assembly;
- at least one processor coupled in electronic data communication with said at least one clearance gap measurement assembly via said processor input channel, said at least one processor configured to receive the clearance gap dimension input signal and the clearance gap magnetic flux input signal; and
- at least one processor output channel coupled in electronic data communication with said at least one processor, said at least one processor output channel configured to transmit at least one processor output signal to an output device.

17. A rotary machine in accordance with claim 16 wherein said at least one processor input channel comprises at least one clearance gap dimension input channel and at least one clearance gap magnetic flux input channel.

18. A rotary machine in accordance with claim 17 wherein said at least one clearance gap dimension input channel and said at least one magnetic flux input channel are substantially time synchronized such that said clearance gap dimension input signal and said clearance gap magnetic flux input signal are acquired substantially simultaneously.

19. A rotary machine in accordance with claim 16 wherein said at least one processor output channel comprises at least one clearance gap dimension output channel and at least one clearance gap magnetic flux output channel.

20. A rotary machine in accordance with claim 16 wherein said processor comprises:
- at least one first resident conversion algorithm configured to:
  - receive said clearance gap dimension input signal; and
  - generate at least one predetermined processor clearance gap dimension output signal; and
- at least one second resident conversion algorithm configured to:
  - receive said clearance gap magnetic flux signal; and
  - generate at least one predetermined processor clearance gap magnetic flux output signal.

* * * * *